Patented Oct. 12, 1937

2,095,224

UNITED STATES PATENT OFFICE 2,095,224

PRODUCTION OF NITRILES

Leonid Andrussow, Mannheim, Germany, assignor to I. G. Farbenindustrie Aktiengesellschaft, Frankfort-on-the-Main, Germany No Drawing. Application November 29, 1935, Serial No. 52,187. In Germany December 21, 1934

12 Claims. (Cl. 260—99.30)

The present invention relates to the manufacture and production of nitriles.

It has already been proposed to prepare nitriles by the action of cyanides on halogen compounds of hydrocarbons or by the decomposition of ammonium salts of the corresponding acids.

I have now found that nitriles can be obtained in an advantageous manner by causing hydrocyanic acid to react with aliphatic ethers at elevated temperatures in the presence of catalysts. For this purpose difficultly reducible oxides and salts may be employed, the so-called hydration catalysts being especially suitable. Suitable catalysts of the said kind are for example aluminium oxide, barium oxide, zinc oxide, or oxides of thorium, zirconium, titanium or silica gel, aluminium sulphate or phosphates and borates of aluminium, silver, cerium, cadmium, zinc, tin, uranium, iron, zinc chromate and zinc tungstate. Mixtures of the said catalysts with each other or with other substances may also be employed. The catalysts of the said kind are especially active when employed in the form of gels or in a peptized form.

The reaction may be carried out at atmospheric, increased or even reduced pressure. When employing ethyl ether or higher ethers, the injurious formation of olefines which frequently takes place is reduced to a minimum by simply increasing the pressure, for example to from 10 to 30 atmospheres. Pressures of 200 atmospheres or more may also be employed.

Substances which split off hydrocyanic acid or compounds acting in the same way as hydrocyanic acid, such as formamide or dicyanogen, may also be employed. It is preferable to use an excess of ether which is returned to the catalyst in circulation after being separated from the nitrile formed and the greater part of the water formed. The circulating gas may contain foreign gases and also moisture. The ethers used need not be pure; a part thereof may be replaced by alcohol. It is advantageous, however, to employ an initial mixture containing only small amounts of water and/or alcohol and if necessary to maintain a large excess of ether in the circulating gas. Generally speaking temperatures of from 200° to 500° C. are suitable and the most favourable reaction temperatures usually lie in the range of from 280° to 350° C.; in many cases, however, a lower or higher temperature may be of advantage.

The following examples will further illustrate how my present invention may be carried out in practice, but the invention is not restricted to these examples.

Example 1

A mixture of 1 molecular proportion of hydrocyanic acid and 2.5 molecular proportions of dimethyl ether is led at 290° C. over peptized aluminium oxide, the speed of flow being 360 litres of vapour mixture per hour per litre of peptized aluminium oxide. From 88 to 93 per cent of the hydrocyanic acid is converted into acetonitrile, from 1 to 2 per cent is unchanged and the remainder is saponified to form ammonia. The excess of ether, which contains a little ammonia and hydrocyanic acid, may be returned in circulation to the vessel containing the catalyst after separation of the acetonitrile.

Example 2

A mixture of 1 molecular proportion of hydrocyanic acid and 2 molecular proportions of diethyl ether is pumped under a pressure of 25 atmospheres at the rate of 1.6 litres of liquid per hour into a pressure-tight pipe heated to 320° C., which is charged with compact granular aluminium hydroxide. Propionitrile is formed in a good yield.

Example 3

A mixture of 1 molecular proportion of formamide and 6 molecular proportions of dimethyl ether is led over a catalyst consisting of alumina gel and containing per litre of this gel 1.5 litres of filling rings of so-called V$_2$A steel at 360° C. under a pressure of from 150 to 180 millimetres (mercury gauge) at a speed of 250 litres of vapour mixture (calculated at atmospheric pressure) per hour. Acetonitrile is formed in a good yield.

Example 4

A vapour mixture containing 20 per cent of hydrocyanic acid, 77 per cent of dimethyl ether, 1 per cent of methanol, and 2 per cent of water is led over a catalyst consisting of 1 litre of alumina gel at 300° C. at a speed of 400 litres of the vapour mixture per hour. From 86–90 per cent of the hydrocyanic acid employed is thus converted into acetonitrile. Two per cent of the hydrocyanic acid is unchanged, the remainder being saponified to form ammonia.

What I claim is:

1. The process for the production of nitriles which comprises reacting hydrocyanic acid with aliphatic ethers at a temperature between about 200 and about 500° C. in the presence of a solid hydration catalyst the latter being employed in the form of gel.

2. The process for the production of nitriles which comprises reacting hydrocyanic acid with aliphatic ethers at a temperature between about 200 and about 500° C. in the presence of a solid hydration catalyst the latter being employed in peptized form.

3. The process for the production of nitriles which comprises reacting hydrocyanic acid with aliphatic ethers at a temperature between about 200° and about 500° C. in the presence of a solid hydration catalyst.

4. The process for the production of nitriles which comprises reacting hydrocyanic acid with aliphatic ethers in the presence of a solid hydration catalyst at a temperature between about 200 and about 500° C., superatmospheric pressure being employed.

5. The process for the production of nitriles which comprises reacting hydrocyanic acid with aliphatic ethers at a temperature between about 280° and about 350° C. in the presence of a solid hydration catalyst.

6. The process for the production of nitriles which comprises reacting substances capable of splitting off hydrocyanic acid with aliphatic ethers at a temperature between about 200 and about 500° C. in the presence of a solid hydration catalyst.

7. The process for the production of nitriles which comprises reacting formamide with aliphatic ethers at a temperature between about 200 and about 500° C. in the presence of a solid hydration catalyst.

8. The process for the production of nitriles which comprises reacting hydrocyanic acid with an excess of an aliphatic ether at a temperature between about 200 and about 500° C. in the presence of a solid hydration catalyst.

9. The process for the production of nitriles which comprises reacting hydrocyanic acid with aliphatic ethers containing alcohols at a temperature between about 200 and about 500° C. in the presence of a solid hydration catalyst.

10. The process for the production of nitriles which comprises reacting hydrocyanic acid with dimethylether at a temperature between about 200 and about 500° C. in the presence of a solid hydration catalyst.

11. The process for the production of nitriles which comprises reacting formamid with dimethylether at a temperature between about 200 and about 500° C. in the presence of a solid hydration catalyst.

12. The process for the production of nitriles which comprises reacting hydrocyanic acid with diethylether at a temperature between about 200 and about 500° C. in the presence of a solid hydration catalyst.

LEONID ANDRUSSOW.